United States Patent Office 2,956,797
Patented Oct. 18, 1960

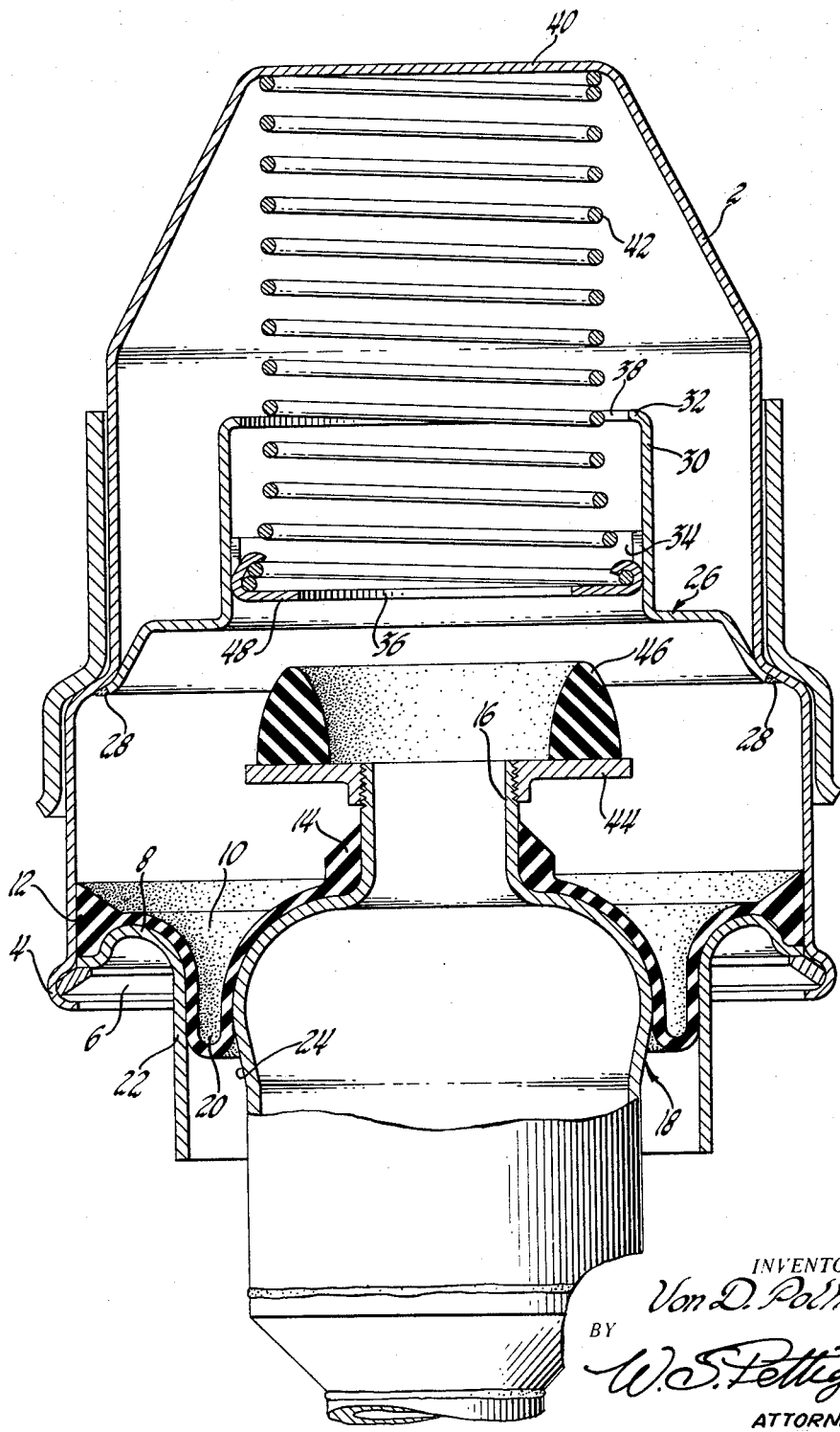

2,956,797

DUAL VOLUME VARIABLE RATE AIR SPRING

Von D. Polhemus, Franklin, Mich., assignor to General Motors Corporation, Detroit, Mich., a corporation of Delaware Filed May 28, 1958, Ser. No. 738,402

10 Claims. (Cl. 267—65)

This invention relates to pneumatic vehicle suspension and more particularly to improved air spring constructions therefor.

The present invention is particularly concerned with provision of a dual volume variable rate pneumatic spring. As used herein, the term dual volume variable rate is intended to mean an air spring in which deflection through a predetermined normal range of movement is characterized by a progressive rate variation above and below a relatively low mean rate, while compression deflection beyond the predetermined range results in a rapid transition to substantially higher rate and more rapid progressive increase in rate thereafter.

In the prior art, various proposals have been advanced for providing a spring of the type defined, as for example by progressively reducing the volume of confined air acted upon by the spring so as to obtain an extremely high spring rate when the spring approaches the maximum compression or bump position. In a typical case, the desired result is obtained by employing a piston and cylinder type spring in which one or more auxiliary air chambers are connected to the main cylinder of the spring via conduits which are located in progressively vertically spaced relation in the wall of the cylinder. In such devices, progressive upward movement of the piston causes sequential blocking of the conduits which progressively cuts off the air in the auxiliary chambers previously acted upon by the piston. Although such arrangements appear to perform the function required, experience has shown that the desired result is negligible, due to the restricting effect of the conduits. In practice, the conduits induce sufficient damping of air movement between the auxiliary chamber and the spring cylinder that during rapid piston movement the air confined in the auxiliary chambers is virtually unaffected by piston movement. In addition, because of the sliding valve principle of operation inherent in such devices, such arrangements are not mechanically adaptable to bellows or diaphragm type air springs such as are commonly employed on vehicle suspension.

An object of the present invention is to provide an improved air spring.

Another object is to provide a dual volume variable rate air spring.

A further object is to provide a dual volume variable rate air spring of the type including an inflexible dome portion having a flexible bellows structure arranged to cover one end thereof, and a piston acting on the bellows.

Yet a further object is to provide an air spring of the type described including piston operated spring positioning means effective upon predetermined compression movement to reduce the volume of air thereafter acted upon by the diaphragm.

Still a further object is to provide a structure of the stated character wherein the interior of the piston is arranged in communication with the interior of the dome so as to increase the volume of air normally acted upon by the spring.

A still further object is to provide a spring of the stated character wherein the remaining volume of air continues to be acted upon by the piston.

These and other objects, advantages and features of the invention will become more fully apparent as reference is had to the accompanying specification and drawing wherein:

The drawing illustrates an air spring construction incorporating the present invention.

As seen in the drawing, the spring comprises an inverted dome-like air chamber 2 which is adapted to be secured to the sprung portion of the vehicle, not shown. At its lower open end, dome 2 is provided with a peripheral inturned lip 4 which is adapted to receive a circular retainer ring 6. Retainer ring 6, in turn, locates a diaphragm retainer ring 8 in concentric relation with the lower open end of dome 2. Ring 8 supports the outer portion of a flexible diaphragm structure 10, the peripheral extremity of which is formed with an enlarged bead 12 adapted to engage the lower wall of dome 2 and outer periphery of ring 8 in air-tight sealing engagement. The inner periphery of diaphragm 10, in turn, is provided with an annular bead portion 14 which surrounds the upwardly projecting hollow neck portion 16 of a bulbous piston structure 18. It will be understood that the lower extremity of piston 18 is pivotally connected to a reciprocating part of the unsprung portion of the vehicle, not shown, so that relative vertical movement between the sprung and upsprung mass causes vertical displacement of the piston with respect to dome portion 2. As will be noted in the drawing, the intermediate portion 20 of diaphragm 10 normally assumes a single convolution depending fold which occupies the space between the straight walled depending portion 22 of retainer 8 and the contoured outer peripheral wall 24 of piston 18. As a result, during up and down movement relative to dome 2, piston 18 is guided in substantially concentric relation with wall portion 22.

In accordance with the present invention, dome portion 2 has disposed therein intermediate the lower open end and upper closed end an annular partition structure 26 which is secured therein by any suitable means as for example by seam welding 28. The central portion of partition structure 26 is deformed upwardly to provide a cylindrical sleeve portion 30, the upper end of which terminates in an inturning flange 32. Slidably disposed in sleeve 30 is a cup-shaped ring member 34 having a large diameter aperture 36 formed in the bottom wall thereof. The outer periphery of ring 34 is dimensioned with respect to the inner periphery of sleeve 30 so as to provide a substantially leak-proof juncture therebetween. Connected to ring 34 and extending upwardly through the opening 38 defined by flange 32 for connection with the upper wall 40 of dome 2 is a coil spring 42. Spring 42 is adapted to urge ring 34 to a vertical position substantially in alignment with the lower extremity of sleeve 30. Threadably secured on the upper end of neck portion 16 of piston 18 is an annular flange member 44. Bonded or otherwise secured to the upper face of flange 44 is an annular elastomeric element 46 which is adapted for abutting engagement with a circular lower wall portion 48 surrounding aperture 36 in ring member 34.

It will now be seen that an air spring assembly has been provided in which relatively limited vertical piston displacement characteristic of normal ride deflection will cause all of the air confined in the dome 2 and interior of piston 18 to be acted upon by the effective area of piston 18 and diaphragm 10. However, where road conditions induce increased deflection of piston 18 sufficient to cause abutting engagement of element 46 with the lower wall portion 48 of ring 34, the total volume of the spring is physically partitioned into two separate compartments, the air in each of which is acted upon independently but concurrently by diaphragm 10 and piston 18, respectively. The first compartment includes all air confined in the annular cavity bounded by the lower wall of partition 26, the lower vertical wall of dome 2, diaphragm 10, and neck portion 16 of piston 18. For the purposes of description, the first compartment and the air confined therein will hereafter be referred to as the first spring. The second compartment includes all air confined in the portion of dome 2 above partition 26 and interiorly of piston 18. For the purposes of description, the second compartment and the air confined therein will hereafter be referred to as the second spring. Following physical partitioning of the spring assembly in the manner described, transition in operation occurs wherein further upward deflection of piston 18 causes the first and second springs to function separately, but in parallel.

Since the volume of air confined in the first spring is sharply reduced in proportion to the total volume previously acted upon by diaphargm 10, resistance to further upward deflection of the diaphragm is substantially increased owing to the fact that a given amount of movement of diaphragm 10 increases the gauge pressure of the smaller quantity of air more rapidly than would be the case with the larger volume. As a result, function of the first spring after transition is characterized by a substantially higher initial rate and more rapid progressive increase in rate. Concurrently with operation of the first spring, piston 18 moves upwardly with ring 34 into dome 2 to function substantially as a piston and cylinder type spring with the result that piston 18 acts on the remaining volume of air contained in the second spring to provide an additional variable rate air spring augmenting the first air spring.

In accordance with a feature of the invention, annular member 46 performs the additional function of serving as a compression bumper which yieldably arrests upward movement of piston 18 when the ring 34 reaches its upper limit of travel in sleeve 30.

It will now be seen that the present invention offers several significant advantages over air springs heretofore known. Of particular significance is the fact that the subject construction permits substantially unrestricted communication between the various cavities defining the total volume of the air spring so that during normal limited deflection of the piston, little or no damping effect occurs; hence, the total volume of air responds uniformly to piston deflection. Equally significant is the fact that a spring according to the present invention continues to utilize all of the air confined in the spring after transition to high rate position, rather than merely rendering a portion of the air totally inactive as in most, if not all prior art devices heretofore known. It will also be noted that transition to the higher rate commences immediately upon contact of element 46 which ring 34, thus allowing accuracy in selection of the desired transition point.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A dual volume variable rate spring comprising two relatively movable members connected by a diaphragm, one of said members having a partition therein, a sleeve formed in said partition defining an opening extending in the direction of said relative movement and normally providing communication between opposite ends of said member, a ring disposed in said opening and slidably engaging said sleeve, and means on the other of said members engageable with said ring to close said opening in a manner preventing communication between said opposite ends of said first member responsive to predetermined movement of said other member.

2. A dual volume variable rate spring comprising two relatively movable members connected by a diaphragm, one of said members having a partition therein, a sleeve formed in said partition defining an opening extending in the direction of said relative movement and normally providing communication between opposite ends of said member, a ring disposed in and slidably engaging said opening, means on the other of said members engageable with said ring to close said opening in a manner preventing communication between said opposite ends of said first member responsive to predetermined movement of said other member, and resilient means acting on said ring permitting the latter to move with said other member after initial engagement therewith.

3. The structure set forth in claim 1 wherein said means on the other said member engageable with said ring comprises an elastic member capable of limited deformation in the direction of movement of said one member.

4. In an air spring of the type including an inflexible container, a piston movable into and out of said container and a flexible diaphragm interconnecting said piston and container, a partition formed midway in said container, a cylindrical opening in said partition providing communication between the portions of said container at opposite ends of said partition, a slidable member disposed in said cylindrical member, said member having a substantial opening therein, and means on said piston adapted to engage said slidable member in a manner closing said opening upon predetermined upward movement of said piston whereby to reduce the volume of air acted upon by said diaphragm during further movement of said piston.

5. The structure set forth in claim 4 wherein the size of said opening in said slidable member is large enough to substantially eliminate damping effects during compression and expansion of air by movements of said piston below said predetermined position.

6. In an air spring, an inflexible container having one open end, a partition dividing said container into two portions, said partition having a central cylindrical portion defining an opening, a piston reciprocably movable in said container generally coaxial with said opening, a diaphragm interconnecting said piston and said open end, a ring member slidable in said cylindrical portion, yieldable means normally biasing said ring to one end of said cylindrical portion, and a resilient member on said piston adapted to engage said ring upon predetermined upward movement of said piston and thereby isolate the portions of said container at opposite sides of said partition during the further upward movement of said piston.

7. In an air spring, an inverted inflexible container having a lower open end, a partition dividing said container into two portions, said partition having a central cylindrical portion defining a vertically extending opening, a piston vertically reciprocably movable in said container generally coaxial with said opening, a diaphragm interconnecting said piston and said lower open end, a ring member slidable in said cylindrical portion, yieldable means normally biasing said ring to the lower extremity of said cylindrical portion, and a resilient member on said piston adapted to engage said ring upon predetermined upward movement of said piston and thereby prevent communication between the portions of said container at opposite sides of said partition during the further upward movement of said piston.

8. In an air spring, an inverted inflexible container having a lower open end and an upper end, a partition intermediate said ends dividing said container, said partition having a central cylindrical portion defining a vertically extending opening, a piston vertically reciprocably movable in said container generally coaxial with said opening, a diaphragm interconnecting said piston and said lower open end, a ring member slidable in said cylindrical portion, yieldable means normally biasing said ring to the lower extremity of said cylindrical portion, and an annular resilient member on said piston adapted to engage said ring upon predetermined upward movement of said piston and thereby isolate the lower end of the container from the upper end during further upward movement of said piston.

9. In an air spring, an inverted inflexible container having a lower open end, a partition disposed vertically intermediate said container, said partition having a central cylindrical wall defining a vertically extending opening, a hollow piston vertically reciprocably movable in said container, said piston having an opening therein normally providing communication between the interior thereof and the entire interior of said container, a diaphragm interconnecting said piston and said open end, a ring member slidable in said cylindrical wall, yieldable means normally biasing said ring to one end of said annular portion, and a resilient member on said piston adapted to engage said ring upon predetermined upward movement of said piston and thereby close the opening defined by said annular portion during the remaining movement of said piston, whereby the diaphragm thereafter acts only on the air contained in the portion of said container below said partition.

10. In an air spring, an inverted inflexible container having a lower open end, a partition disposed vertically intermediate said container, said partition having a central cylindrical wall defining a vertically extending opening, a hollow piston vertically reciprocably movable in said container, said piston having an opening therein normally providing communication between the interior thereof and the entire interior of said container, a diaphragm interconnecting said piston and said open end, a ring member slidable in said cylindrical wall, yieldable means normally biasing said ring to one end of said annular portion, and a resilient member on said piston adapted to engage said ring upon predetermined upward movement of said piston and thereby close the opening defined by said annular portion during the remaining movement of said piston, whereby the diaphragm thereafter acts only on the air contained in the portion of said container below said partition while said piston acts on the air confined interiorly thereof and the air confined in the portion of said cylinder above said partition.

References Cited in the file of this patent

UNITED STATES PATENTS

| | | |
|---|---|---|
| 991,165 | Mills | May 2, 1911 |
| 2,147,990 | Richter | Feb. 21, 1939 |
| 2,842,359 | Auer | July 8, 1958 |